(12) United States Patent
Austin et al.

(10) Patent No.: US 6,498,568 B1
(45) Date of Patent: Dec. 24, 2002

(54) PIPELINE COMMUNICATION SYSTEM

(75) Inventors: David Austin, Sacriston (GB); Koos Broekhuizen, Shepshed (GB); Paul Beaumont Cordes, Whitley Bay (GB); Gerard Terence Foster, Blunsdon Ridge (GB)

(73) Assignee: Transco PLC, London (GB)

( * ) Notice: Subject to any disclaimer, the term of this patent is extended or adjusted under 35 U.S.C. 154(b) by 0 days.

(21) Appl. No.: 09/269,178

(22) PCT Filed: Sep. 24, 1997

(86) PCT No.: PCT/GB97/02590

§ 371 (c)(1),
(2), (4) Date: Nov. 16, 1999

(87) PCT Pub. No.: WO98/13960

PCT Pub. Date: Apr. 2, 1998

(30) Foreign Application Priority Data

Sep. 26, 1996 (GB) .......................................... 96200746

(51) Int. Cl.[7] ................................................ G01V 3/00
(52) U.S. Cl. ................................ 340/854.5; 340/854.4; 166/97.5
(58) Field of Search .......................... 340/854.5, 854.4; 166/97.5

(56) References Cited

U.S. PATENT DOCUMENTS 3,129,394 A * 4/1964 Long ............................. 333/27
5,587,707 A * 12/1996 Dickie et al. ............ 340/870.09

* cited by examiner

*Primary Examiner*—Timothy Edwards, Jr.
(74) *Attorney, Agent, or Firm*—Oblon, Spivak, McClelland, Maier & Neustadt, P.C.

(57) ABSTRACT

A pipeline communication system. The system uses the pipeline and the adjacent ground and includes branches with junctions. Governor modules and transformers/rectifiers form part of the network. Monitors periodically provide information to the network controller. The system control receives information by way of an outstation to provide two-way communication and control using the pipeline and adjacent ground as conductors. Typically, the information in the form of fast frequency shift keying modulation is superimposed on the cathodic pipe protection system.

36 Claims, 7 Drawing Sheets

PIPELINE COMMUNICATION SYSTEM

The invention relates to a pipeline Communication system for providing monitoring and/or control of pipeline based plant and equipment.

SUMMARY OF THE INVENTION

In patent documents WO-A-9326115 and FR-A-2097265 undersea pipeline systems cooperating with an offshore drilling platform are disclosed having a communications link.

The present invention is concerned with a land based system.

According to the invention there is provided a pipeline communication system for an electrically conductive pipeline insulated from the adjacent ground and including; transmitter means for sending information from a remote station using the pipeline and the adjacent ground as conductors; receiver means for receiving information at a remote station using the pipeline and the adjacent ground; and means employing recovery techniques to enhance the degraded received signals due to their passage along the pipeline and the adjacent ground.

Further according to the invention a communication method employing an electrically conductive pipeline insulated from the adjacent ground the method including transmitting information from a remote station by using the pipeline and the adjacent ground as conductors, employing recovery techniques to enhance the degraded received signals to recover the information therein.

BRIEF DESCRIPTION OF THE DRAWINGS

The invention will now be described by way of example with reference to the accompanying drawings in which.

DETAILED DESCRIPTION OF THE PREFERRED EMBODIMENTS

Figure 1:
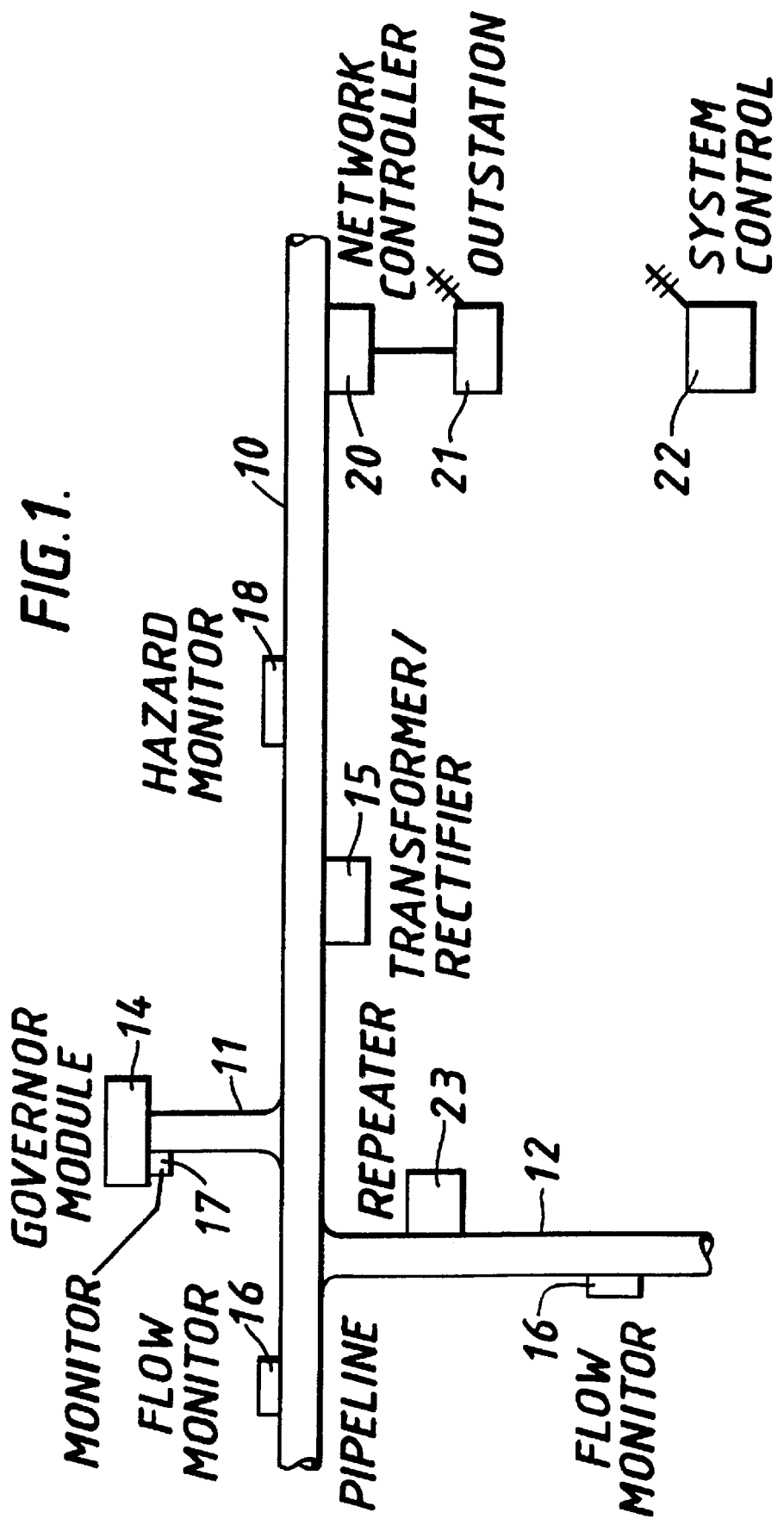
FIG. 1 shows an example of a pipeline network utilising the invention.

FIG. 1 shows a typical pipeline arrangement employing the invention. The pipeline 10 includes junctions 11 and 12. Equipment or plant such as governor modules 14 and transformer/rectifiers (T/R) 15 form part of the network. A number of monitors including flow monitors 16, governor monitor 17 and hazard monitor 18 periodically provide information to the network controller 20. This information can pass to the system control 22 via outstation 21 using a telemetry link operating over one of the normal means of data communications, with access by radio link, the PSTN or other suitable equipment. To communicate to the controller 20, the monitors use the pipeline as a conductor. In order to use the earth as the return conductor, the metal pipe is insulated therefrom. Although transmission signals may be directly applied to the pipe, typically they will be superimposed on the existing cathodic pipe protection system.

In addition to monitoring signals, control signals can be sent from controller 20 to adjust governors, transformer/rectifiers or other plant provided. Hence two way communication is available.

The communication system employs low frequency (typically 5–20 HZ but could be as high as 200 HZ) low bandwidth modulation techniques. Modulation is typically in the form of fast frequency shift keying (FFSK). Because of the length of pipeline that can be involved, typically up to 50KM, the attenuation of the signals can be high as well as associated noise levels giving rise to low signal to noise-ratios. Hence it can be that noise is so high that the signal to noise ratio can be low, typically 5dB. To overcome this, signal recovery techniques are employed typically using matched filters. Repeaters 23 can also be employed to increase signal levels and will be sufficiently intelligent to monitor embedded address destinations and hence the need for selective regeneration. The transmitter uses FFSK applying a tone of one frequency to represent an input bit with a data sense of '1' and a second frequency tone to represent an input bit with a data sense of '0'. These data bits are clocked at a data rate of typically 10 bits per second. The system is not limited to two tones. Additional tones can be used to send multiple data bits in parallel.

Figure 2:
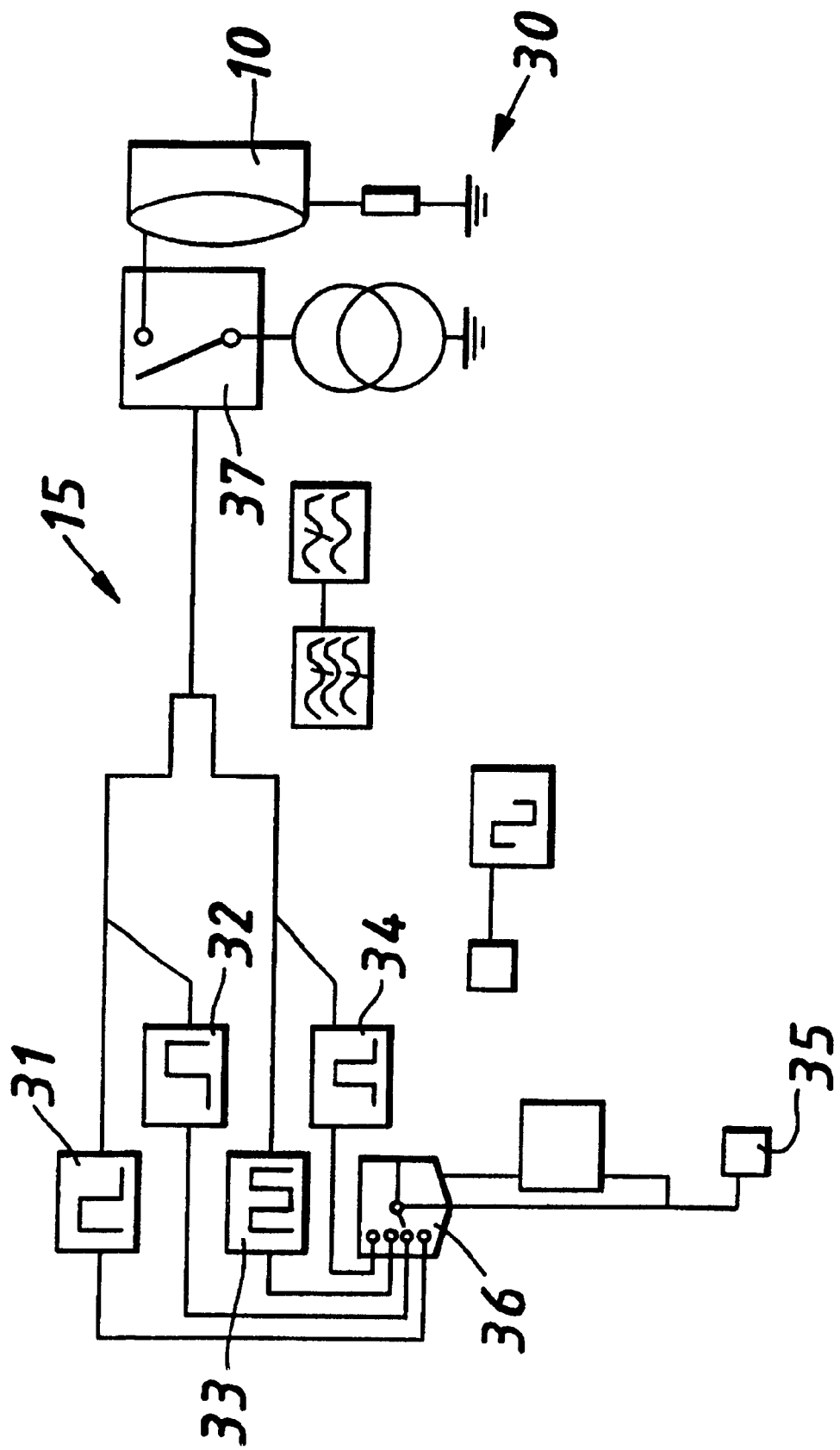
FIG. 2 shows a transmitter for the pipeline communication employing frequency shift keying techniques.
Figure 3:
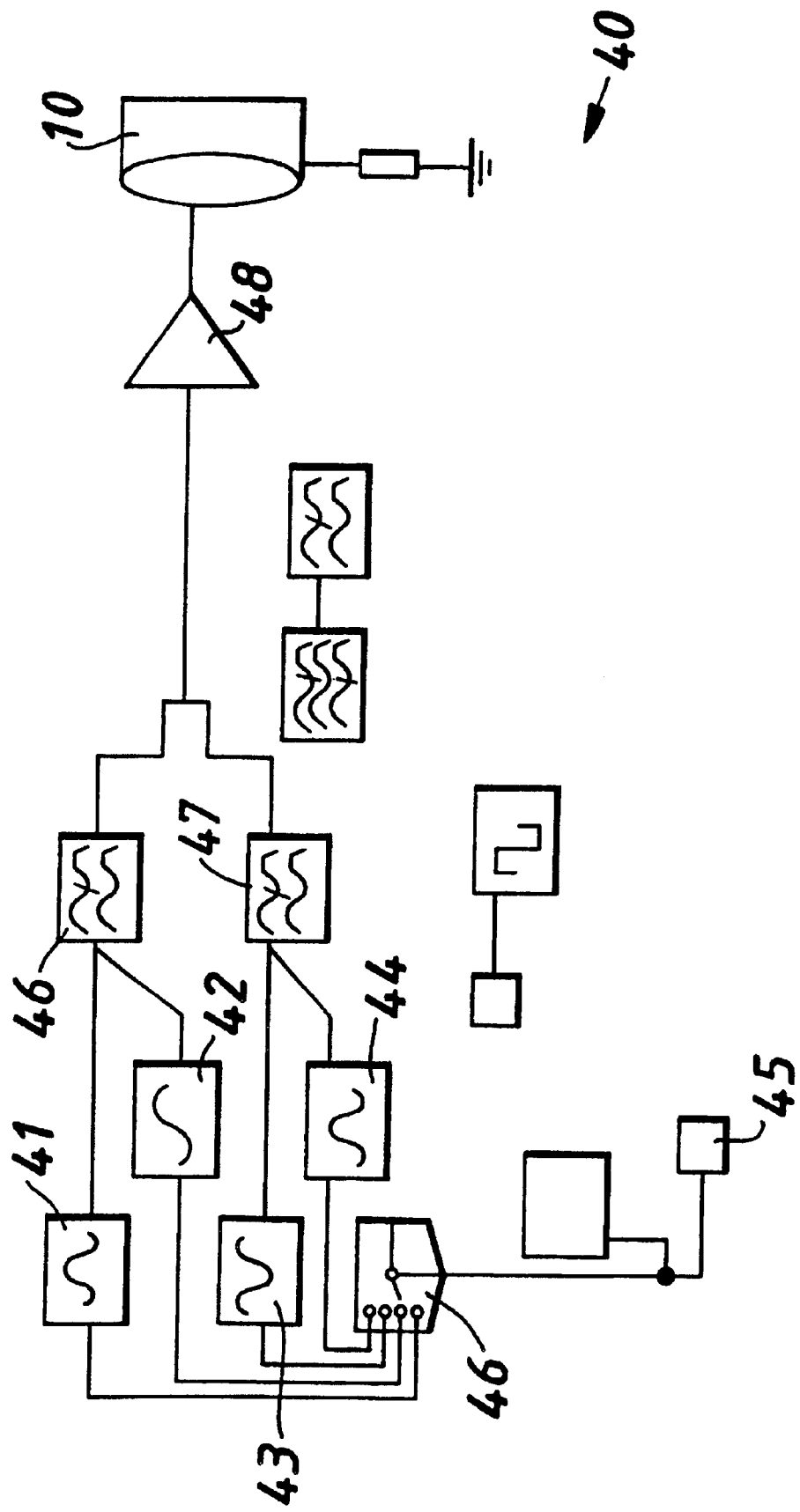
FIG. 3 shows an alternative transmitter arrangement where the signal is amplified and applied directly to the pipe.

FIG. 2 shows the structure of a transmitter suitable for transformer/rectifier sites. The transmitter 30 comprises waveform generators 31–34 which transmitter receives the data at input 35 which selects 10 Hz tone as an indication of data '1' and a 15 Hz tone as a data '0' via selector 36. Using Fast Frequency Shift Keying (FFSK) at 10 baud, the modulated data signal is applied by modulating part of the current applied to the pipe (current switch 37) which provides cathodic protection (CP) as a result of the pipeline resistance. The signals are in digital form with multistage representations of the two modulating tones. Each state of these tones represents the switching levels for the transformer/rectifier pipeline devices. The bandwidth of the pipe is such that the switching harmonics are considerably reduced through their passage in the pipe so are of no great concern at the receiver.

Where stand-alone sites occur the data signal is amplified and applied directly to the pipe using a transmitter 40 as shown in FIG. 3. The transmitter includes waveform generators 41–44 which transmitter receives the data at input 45 and selects 10 Hz or 15 Hz as before. The signals are applied to the pipeline via low pass filters 46, 47 and amplifier 48. The signals are all digital representations but imposed on the pipe CP as an analog.

Figure 4:
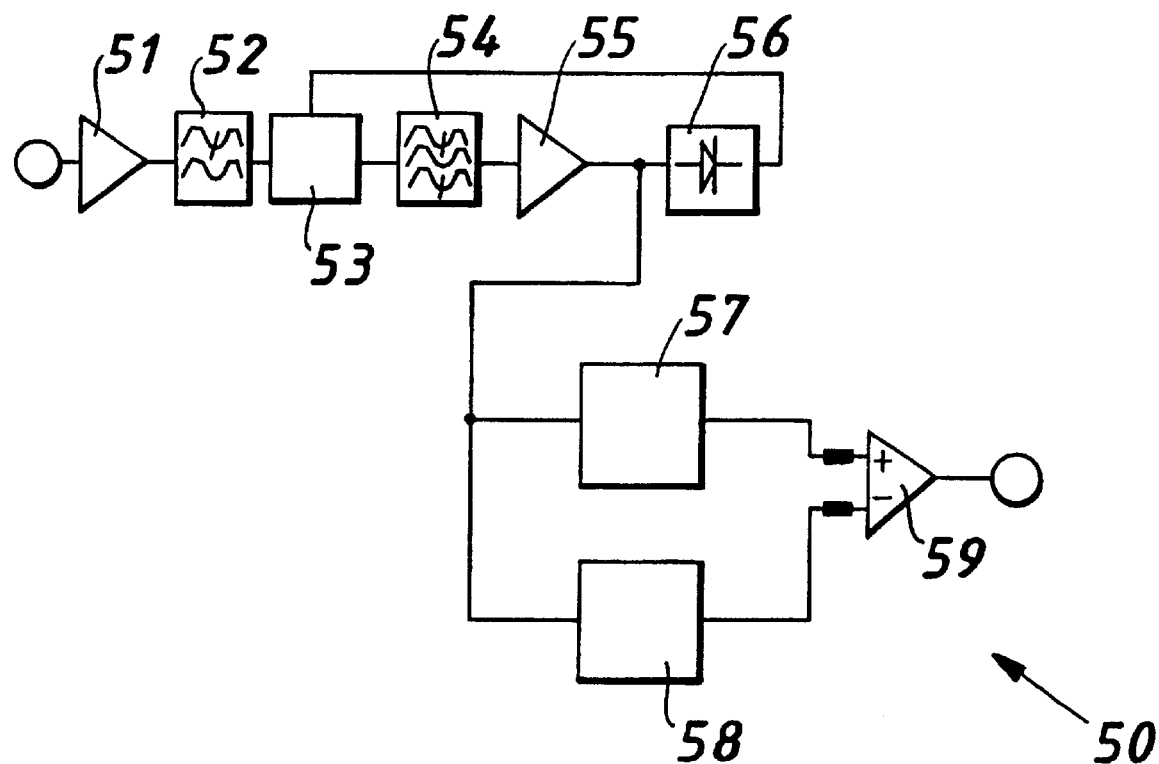
FIG. 4 shows a receiver suitable for receiving transmitted signals taken from the pipeline.
Figure 5:
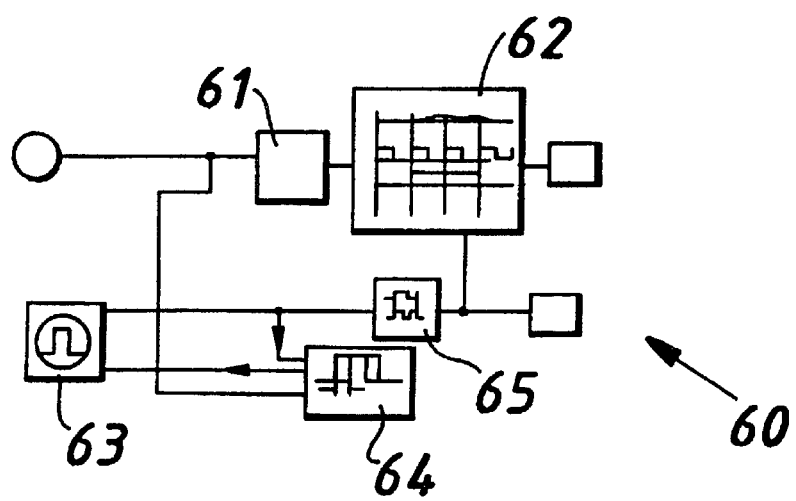
FIG. 5 shows a clock recovery arrangement for use with the output from the receiver in FIG. 4.

The receiver needs to cope with signal to noise ratio of only 5dB for a typical pipe distance of 40 KM. A suitable receiver is shown in FIG. 4. The receiver 50 is a non-coherent FFSK matched filter receiver. The receiver 50 includes amplifier 51, low pass filter 52 and automatic gain control 53 and through the band pass filter 54. The filter output is passed via amplifier 55 to detector 56. This allows the analog signal from the pipe to be received and the digital data recovered into streams F1 and F2. Matched filters 57 and 58 and summer 59 provide the recovered (uncloacked) data at its output. Separate matched filter paths are used for each tone and data decisions are made by comparison of the resultant energy output from each filter. Symbol recovery is derived from the data decision stream. Each matched filter is implemented as an integration of the incoming data stream multiplied by a sine wave at the respective sub-carrier frequency (over each successive study symbol period). This is an analog autocorrelation of each tone with the received incoming data stream. In order to recover the transmitted clocks accompanying the transmitted data, the circuit of FIG. 5 is employed. The clock recovery circuit 60 includes a sample delay 61 and data slicer 62. A digital voltage controlled oscillator 63 and phase locked loop 64 and doubler 65. Clock recovery is effected by tracking both the peaks of the autocorrelation streams to form a new clock sampling stream derived from the instantaneous value from either of the correlated streams. This clock sampling stream is recovered at the clock rate.

Figure 6:
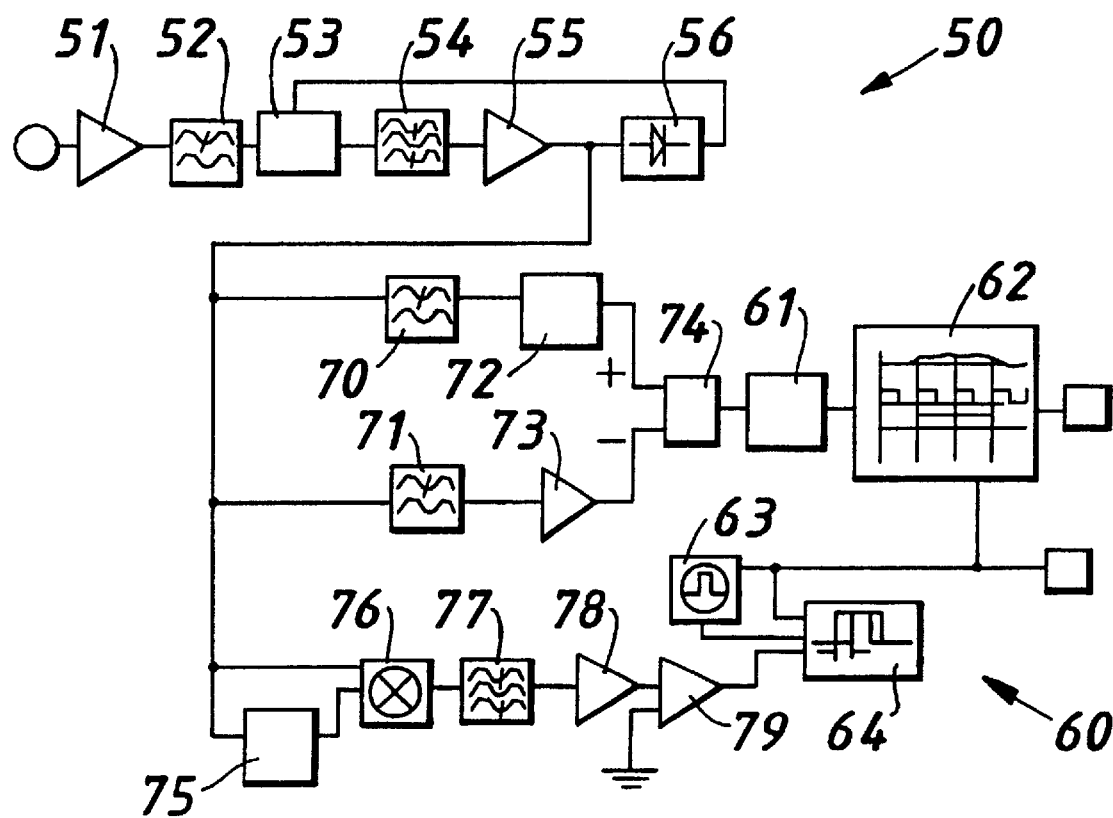
FIG. 6 shows an alternative analog non-coherent receiver to that of FIG. 4 with some constructional advantages.

In practice the analog non-coherent receiver can be modified to that shown in FIG. 6. The components include low pas filters 70 and sample delay 72 on one path and low pass filter 71 and amplifier 73 on the other path passing to summer 74 and hence to delay 61. Other paths include delay 75 and mixer 76. The output from mixer 76 goes to band pass filter 77 and then to amplifier 78 before input to comparator 79.

Figure 7:
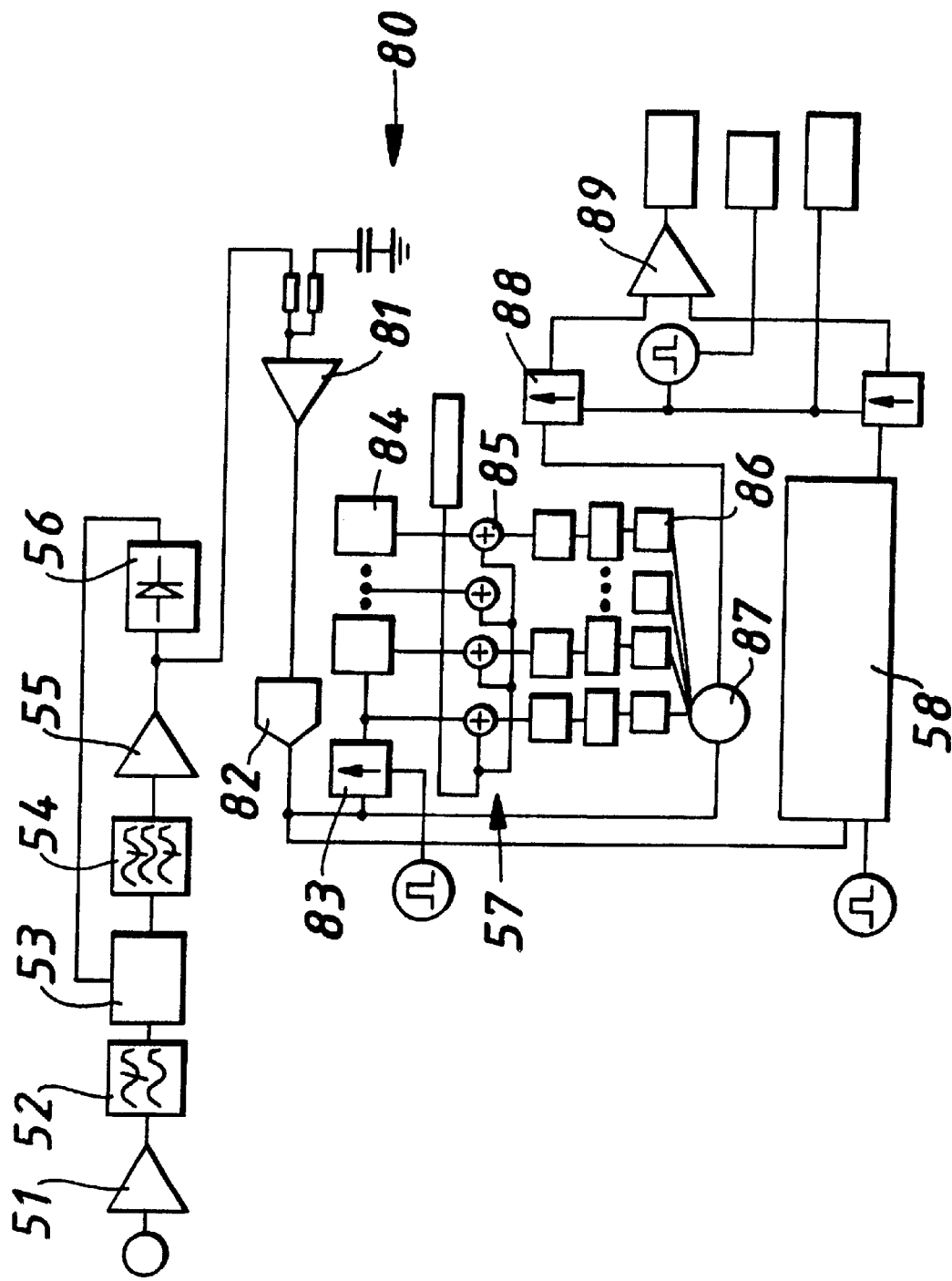
FIG. 7 shows correlation using a digital version of the receiver of FIG. 4.

When digital implementation is required a receiver can be constructed as shown in FIG. 7. This uses matched filters and employs a series of correlators. The analog first stage output is received by summing amplifier 81 and converted into digital form via analog to digital converter 82. The dual path filtering 57 and 58 is provided as before now in digital form. As shown in the upper (expanded) path a sampler 83 with delays 84 and adders 85, dividers 86 and summer 87 to path sampler 88 and comparator 89. Hence, the received analog signal is amplified, filtered and fed to an automatic gain control loop. Typically the LPF has a −3 dB cut off at 20 HZ. The AGC uses a bandpass filter with −3 dB points at 7.5 HZ and 17.5 HZ to select the band of interest for detection. The level detector input is used to adjust the gain of the loop so that the output AC peak to peak signal most closely fits the peak to peak full scale (FS) limit of the digital convertor (ADC). The ADC gives typically 10 bit resolution. F1 and F2 paths are concerned respectively with each matched filter.

Figure 8:
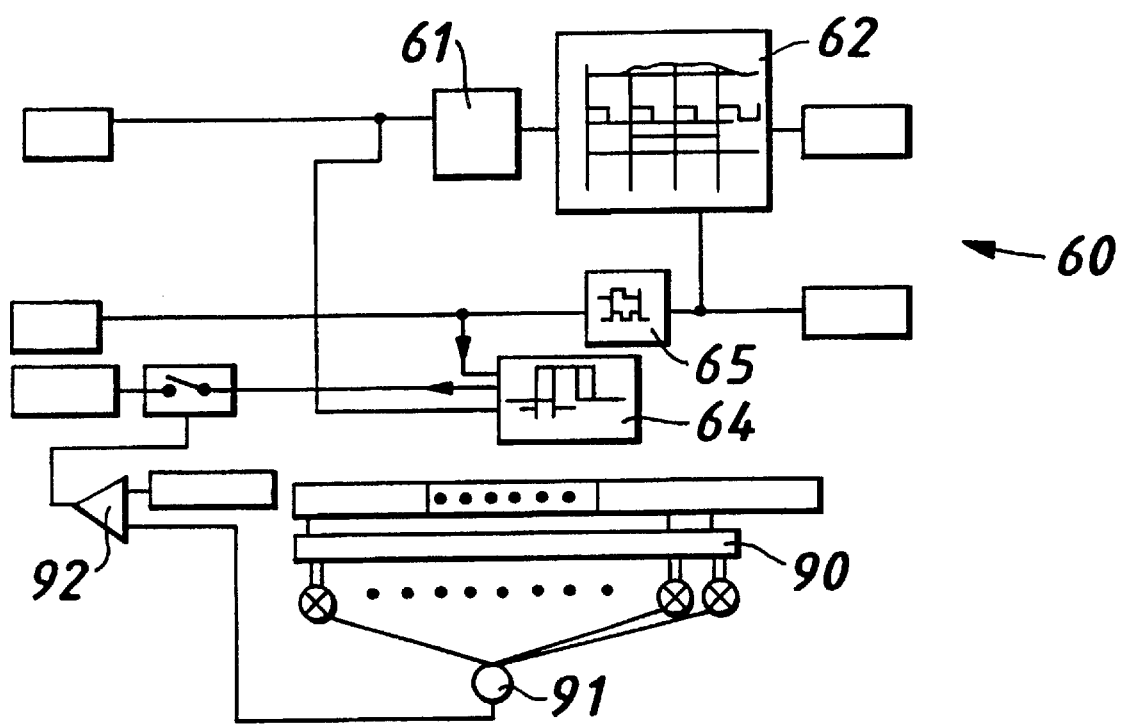
FIG. 8 shows the digital arrangement for clock recovery from the receiver of FIG. 6.

Clock recovery associated with the transmitted information has to be extracted from transmitted information when received using correlation techniques employing data registers as is shown in FIG. 8.

The devices 61–65 are provided as before and now digital data in the registers 90 with associated summer 91 and comparator 92 utilise samples available from the F1 and F2 sample streams. The nature of the communication channel used by this system is such that equalisation is usually required for acceptable data performance. If the same hardware is to be used with many different pipe types, sizes and coatings then the pipe frequency and phase characteristics may be extremely varied. Automatic Equalisation is therefore included to compensate for gross amplitude non-linearities with frequency at design level of around +/−15 dB across the modulation band for the currently preferred modulation scheme. Other forms of equalisation could be implemented if another modulation scheme was used. The new equalisation scheme may then require a different amount of fixed or automatic equalisation, accordingly.

The communications bearer system described here forms a data network for remote monitoring between the controller on each section of electrically isolated pipe and the monitors. The remote monitoring data network (RMDN) detailed here uses a multilevel priority access technique using Carrier Sense Multiple Access (CSMA) with N-Persistent retries. Two priority levels are used at present. High Priority (HP) and Low Priority (LP), however more levels may be used in the future according to user demands. At present, all LP monitoring messages are allowed M-access_retries and all HP alarm and control messages are allowed P-access_ retries where M, N and P are statistically chosen to ensure that all HP messages are successful and a percentage Q (acceptable to the user) of LP message get through.

The system has been designed to operate over a channel at ranges where the SNR is better than 5 dB and the signal level is greater than 100 mV at the receiver. These parameters have been chosen as a compromise of current technology versus perceived cost of the marketable product. Performance at lower threshold and SNR values could be considered in the future, according to market trends.

Repeater functionally is provided to route messages via repeaters between initiating and destination units that are physically separated by a distance greater than the maximum Inter-Unit Distance (IUD). The system described here, can support up to 512 repeater units, allowing a network of between 1 and 10, 220 m in length, per electrically isolated section. The maximum serviceable length of pipeline chosen here has been identified from typical long-haul pipelines in the world to date. The protocol may be changed to accommodate longer pipelines in the future, but this is seen as not likely to be cost effective, today.

A proprietary protocol is used for data operation over the remote monitoring network between the monitor and the system control. The protocol is designed to realise the optimum data performance over the system by matching the data techniques used to the communications channel formed by the pipe.

This system uses up to 5 pre-defined data packet sizes and up to 16 user defined data message types within each packet. Each packet has Forward Error Connection (FEC) and bit interleaving applied to it on transmission. Error checking is performed using a standard CRC. The system uses standard run in and byte synchronisation techniques. The byte synchronisation word used is 32 _bits long and there are 5_different words used, one to identify each of the different packet types.

The number of packets and user defined messages has been chosen to suit the present Gas Market. However, these parameters could be adjusted for another market in the future.

Within each data packet, two way routing fields are used to route packets via units capable of repeating messages.

What is claimed is:

1. A pipeline communication system for an electrically conductive pipeline insulated from an adjacent ground, comprising:

transmitter means for sending information from a remote station using the pipeline and the adjacent ground as conductors;

receiver means for receiving information at a remote station using the pipeline and the adjacent ground;

means employing recovery techniques to enhance the degraded received signals due to their passage along the pipeline and adjacent ground; and wherein the receiver means further includes
a non-coherent receiver having detector means for detecting the received information;

autocorrelator data recovery means for recovering data derived from the information; and clock recovery means for rebuilding clocking information by tracking information from the autocorrelator data recovery means.

2. A system as claimed in claim 1 including means for receiving and rebuilding information irrespective of the fact that the timing of the transmission and reception are not interlinked.

3. A system as claimed in claim 1 including means for recovering clock timing information from the received information.

4. A system as claimed in claim 1, including autocorrelation means for recovering information to provide a clock sampling stream.

5. A system as claimed in claim 1, wherein the means employing recovery techniques includes matched filtering.

6. A system as claimed in claim 1, wherein the means for recovering information includes a non-coherent matched filter to recover clock information.

7. A system as claimed in claim 1, further comprising: an equalization means for compensating for non-linearity dependent on selected frequency.

8. A system as claimed in claim 1, wherein the receiver means includes input signal conditioning means prior to the detector means and the autocorrelator data recovery means includes first and second matched filter means connected to a summer means.

9. A system as claimed in claim 1 including means for superimposing the information on a cathodic pipe protection system.

10. A system as claimed in claim 1 including repeater stations to sustain at least some of the signals along the pipeline in required direction based on route destination information.

11. A system as claimed in claim 1 including a plurality of monitor devices for periodically providing information to a network controller.

12. A system as claimed in claim 11 including a remote system controller having a communication link to the network controller.

13. A system as claimed in claim 1 including a network controller and wherein control information can be sent to provide two way communication so as to actuate remote equipment attached to the pipeline using the pipeline and the adjacent ground as the signal path.

14. A system as claimed in claim 13 including a pipeline governor module said network controller being configured to adjust the operation of the governor module.

15. A system as claimed in claim 13 including a flow monitor for periodically providing status information to the network controller.

16. A system as claimed in any preceding claim 1, wherein the transmitter means includes means for transmitting signals at low frequency.

17. A system as claimed in claim 16, wherein the transmitter is configured to modulate the information on a low frequency carrier employing frequency shift keying.

18. A system as claimed in claim 16 including first transmitter means for transmitting information in a first mode when a remote station is directly connected to the pipeline, and second transmitter means for transmitting information in a second mode when a remote station is connected to the pipeline via cathodic protection means.

19. A system as claimed in claim 16, wherein the first transmitter means includes low pass filtering means for providing an analog output to the pipeline.

20. A system as claimed in claim 16, wherein the repeater stations include means for identifying addresses to select repeating requirements.

21. A pipeline communication system for an electrically conductive pipeline insulated from its surroundings, the system comprising:

transmitter means for sending information from a remote station using the pipeline and adjacent surroundings as conductors;

receiver means for receiving information at a remote station using the pipeline and the adjacent surroundings;

means for employing recovery techniques to enhance the degraded received signals due to their passage along the pipeline and adjacent surroundings; and wherein the transmitter means includes means for superimposing information on a cathodic pipe protection system current and means for applying a data signal directly to the pipeline and by the pipeline being surrounded by the ground.

22. A system according to claim 21, including means for recovering timing information from the received information.

23. A system according to claim 21, wherein the means employing recovery techniques includes a non-coherent matched filter to recover clock information.

24. A system according to claim 21, wherein the control information is sent to provide two way communication so as to actuate remote equipment attached to the pipeline using the pipeline and the adjacent ground as the signal path.

25. A system according to claim 21, wherein the means employing recovery techniques includes matched filtering.

26. A system according to claim 25, wherein the filtering includes correlation means.

27. A system according to claim 21, wherein the transmitter means includes means for transmitting signals at low frequency.

28. A system according to claim 27, wherein the transmitter means is configured to modulate the information on a low frequency carrier employing frequency shift keying.

29. A system according to claim 21, further comprising:

a repeater station to sustain at least some of the signals along the pipeline in required direction.

30. A system according to claim 29, wherein the repeater station includes means for identifying addresses to select repeating requirements.

31. A system according to claim 29, further comprising:

a plurality of monitor devices for periodically providing information to a network controller.

32. A system according to claim 31, further comprising:

a remote system controller having a communication link to a network controller.

33. A communication method employing an electrically conductive pipeline insulated from adjacent surroundings, the method comprising:

transmitting information from a remote station using the pipeline and the adjacent surroundings as conductors;

receiving the information at a remote station using the pipeline and the adjacent surroundings;

employing recovery techniques to enhance the degraded received signals to recover the information therein; and transmitting information on a cathodic pipe protection system current and by applying a data signal directly to the pipeline and by the adjacent surroundings being the ground.

34. A method according to claim 33, wherein the recovery step includes filtering the information and detecting clock information present on the received information.

35. A method according to claim 33, further comprising:
transmitting the information by modulating a low frequency carrier and employing frequency shift keying.

36. A pipeline communication system for an electrically conductive pipeline insulated from its surroundings, the system comprising:

transmitter means for sending information from a remote station using the pipeline and adjacent surroundings as conductors, the transmitter means including means for superimposing information on a cathodic pipe protection system and means for applying a data signal directly to the pipeline and by the pipeline being surrounded by the ground;

receiver means for receiving information at a remote station using the pipeline and the adjacent surroundings, wherein the receiver means further includes a non-coherent receiver having detector means for detecting the received information;

autocorrelator data recovery means for recovering data derived from the information;

clock recovery means for rebuilding clocking information by tracking information from the autocorrelator data recovery means; and means for employing recovery techniques to enhance the degraded received signals due to their passage along the pipeline and adjacent surroundings.

\* \* \* \* \*